(12) United States Patent
Nogueroles Vines et al.

(10) Patent No.: US 7,544,261 B1
(45) Date of Patent: Jun. 9, 2009

(54) PROCESS AND TOOLS FOR MANUFACTURING COMPOSITE RING FRAMES

(75) Inventors: Pedro Nogueroles Vines, Madrid (ES); Aquilino Garcia Garcia, Madrid (ES); Jesus Manuel Martin Martin, Madrid (ES)

(73) Assignee: Airbus Espana, S.L., Madrid (ES)

( * ) Notice: Subject to any disclaimer, the term of this patent is extended or adjusted under 35 U.S.C. 154(b) by 409 days.

(21) Appl. No.: 11/363,496

(22) Filed: Feb. 27, 2006

(30) Foreign Application Priority Data

Dec. 29, 2005 (ES) .................... PCT/ES05/70186

(51) Int. Cl.
*B29C 65/02* (2006.01)
*B32B 37/00* (2006.01)
*B32B 38/04* (2006.01)
*B32B 39/00* (2006.01)

(52) U.S. Cl. .................... 156/202; 156/214; 156/228; 156/266; 156/289; 156/307.3; 264/34; 264/35; 264/138; 264/152

(58) Field of Classification Search .................. 156/196, 156/199–202, 211–214, 217, 228, 242, 243, 156/250, 265–267, 269, 289, 290, 307.1, 156/307.3, 307.4, 307.7, 308.4, 443, 475, 156/476, 477.1, 510, 580, 581; 264/34, 35, 264/138, 152, 157, 160, 163, 239, 241, 258, 264/259, 263, 285, 294, 295, 297.1, 297.4, 264/300, 319, 320; 425/28.1, 34.1, 35, 39, 425/40, 47, 500–502, 506–508, 510, 515, 425/521, 121, 123, 296, 297, 324.1, 330, 425/340, 354, 355, 363, 383, 384, 394, 403
See application file for complete search history.

(56) References Cited

U.S. PATENT DOCUMENTS

| 5,546,880 | A | * | 8/1996 | Ronyak et al. ......... 112/475.01 |
| 5,648,109 | A | * | 7/1997 | Gutowski et al. ........... 425/504 |
| 6,355,133 | B1 | * | 3/2002 | Williams .................... 156/296 |
| 6,508,909 | B1 | * | 1/2003 | Cerezo Pancorbo et al. .................... 156/306.6 |
| 6,735,866 | B2 | * | 5/2004 | Nogueroles et al. ........ 29/897.2 |
| 7,056,402 | B2 | * | 6/2006 | Koerwien et al. ............. 156/93 |
| 2004/0074578 | A1 | * | 4/2004 | Dewing ..................... 152/400 |

FOREIGN PATENT DOCUMENTS

EP          1547756 A1 *   6/2005

\* cited by examiner

*Primary Examiner*—Philip C Tucker
*Assistant Examiner*—Sing P Chan
(74) *Attorney, Agent, or Firm*—Ladas and Parry LLP

(57) ABSTRACT

The present invention relates to a process for manufacturing composite ring frames for aeronautical fuselages by means of the application of the RTM technology to two preforms with C- and L-shaped sections manufactured using two tools (21, 55) in the following steps: providing the material; hot-forming planar rectangular laminates (41); hot-forming laminates of right angle section (51) on one part of right angle section of the first tool (21), placing an elastic membrane (55) and applying a temperature and vacuum cycle; hot-forming the preforms into a C shape (11) and L shape (13) on a second curved tool (55) by deforming said laminates of right angle section (51) thereon, and applying a temperature and vacuum cycle. The invention also relates to said tools (21, 55).

2 Claims, 6 Drawing Sheets

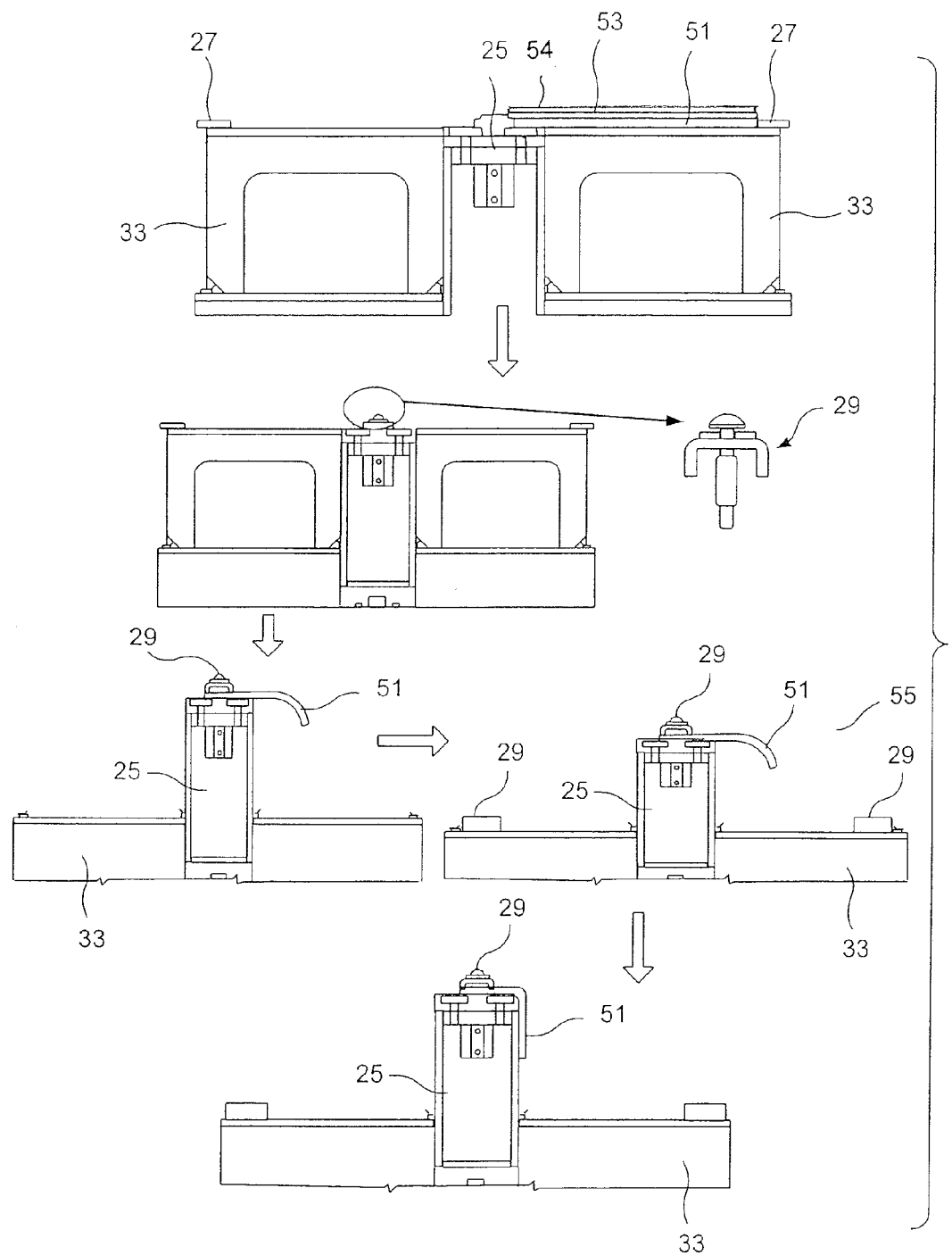
F I G. 5

PROCESS AND TOOLS FOR MANUFACTURING COMPOSITE RING FRAMES

FIELD OF THE INVENTION

The present invention relates to a process for manufacturing composite aeronautical fuselage ring frames by means of the RTM (resin transfer moulding) technology, and particularly to the steps of that process in which the preforms subjected to the final resin injection step are manufactured.

BACKGROUND OF THE INVENTION

In the aeronautical industry the resistance-weight ratio is a fundamental aspect, and for this reason the tendency has gone from using metal structures to using structures manufactured or optimized with composites.

In the process of optimizing all types of aeronautical structures, maximally reducing weight and integrating the largest number of parts is sought so as to reduce both the duration of the assembly process and the handling of smaller components.

The manufacture of ring frames in the known art is carried out on the basis of machined metal structures or shaped sheet metal structures, reinforcing the part bearing the most load with machined parts. In the case of shaped sheet metal, the section normally used is obtained in two pieces: on one hand the Z is manufactured, and on the other hand the angle or babbetes which are riveted to the previous section (see FIG. 1a), are manufactured.

This process has the drawback of requiring long assembly times and the resulting weight exceeds the weight obtained when making the same section in an integrated manner.

The present invention has as an object providing a process resolving the drawbacks from the prior art.

SUMMARY OF THE INVENTION

The present invention proposes a process for manufacturing composite ring frames for aeronautical fuselages by means of applying the RTM technology to two preforms with C- and L-shaped sections, characterized in that said preforms are manufactured, using a first and second tool, in the following steps:

Providing the fabric for the preforms in pieces of material cut according to preset patterns.

Hot-forming planar rectangular laminates by placing layers of pieces of material on a first tool in predetermined positions and number and applying pressure and temperature so that the pieces of material adhere to one another only locally, i.e. not on their entire surface, only along a longitudinal strip where the unidirectional tape reinforcements are arranged.

Hot-forming laminates of right angle section from segments of said planar laminates of predetermined dimensions, obtained by means of cutting, on a part of right angle section of the first tool, arranging on its top side the part intended for the flange of the preforms with a C- or L-shaped section, holding one longitudinal edge over the tool and allowing the rest to be free; placing an elastic membrane on the tool and applying a temperature and vacuum cycle.

Hot-forming the preforms into a C and L shape on a second curved tool by deforming said laminates of right angle section thereon, said deformation including in the case of C-shaped preforms the bending of the second flange, and applying a temperature and vacuum cycle.

The present invention also relates to the two mentioned tools.

The first tool is formed by a central module and two side modules joined together so as to make the laminate of the preforms as well as to perform the longitudinal joining of the patterns by means of overlaps, and they are separated to carry out the step of hot-forming the laminates of right angle section, and heating heads for carrying out the application of pressure and temperature of the step for hot-forming the planar laminates.

The central module has heating elements, vacuum intakes and a hold-down plate with a pneumatic actuator arranged on the central module for hot-forming the laminates of right angle section.

The second tool comprises a curved male module with mortising to position the flange and flanges, respectively, of the L- or C-shaped laminates and a plurality of elastic strips for holding the laminates during their hot-forming process.

The manufacture of ring frame preforms which will subsequently be injected in the RTM process is facilitated by means of the process of the present invention with the following advantages:

Ring frames with complicated geometries and integrated ring frames are manufactured, meeting the objective sought in any structure.

The one-sided only surface finish problem is resolved by adding high dimensional precision without any reduction of radiuses because the autoclave is not used.

Control of thicknesses is improved (reaching tolerances $\leq 0.2$ mm), whatever these thicknesses may be, and therefore a good fit between the outer flange of the ring frames with the overlay and the stringer is obtained.

The process is repetitive, with short curing cycle times, reducing the duration of the manufacturing process.

Other features and advantages of the present invention shall be gathered from the following detailed description of an illustrative embodiment of its object in relation to the attached drawings.

BRIEF DESCRIPTION OF THE DRAWINGS

FIG. 5 schematically shows the different phases of the step for forming planar laminates of the process object of the present invention.

DETAILED DESCRIPTION OF THE INVENTION

Figure 1A:
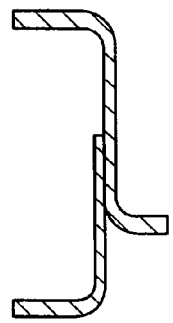
FIG. 1a shows a section of a ring frame made of metal and FIG. 1b shows a section of a ring frame made of a composite manufactured by means of the process object of the present invention.
Figure 1B:
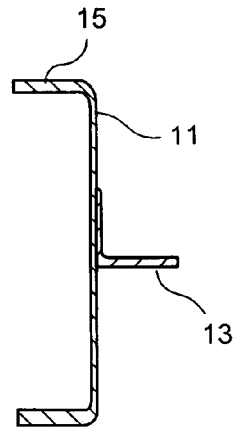
Figure 2A:
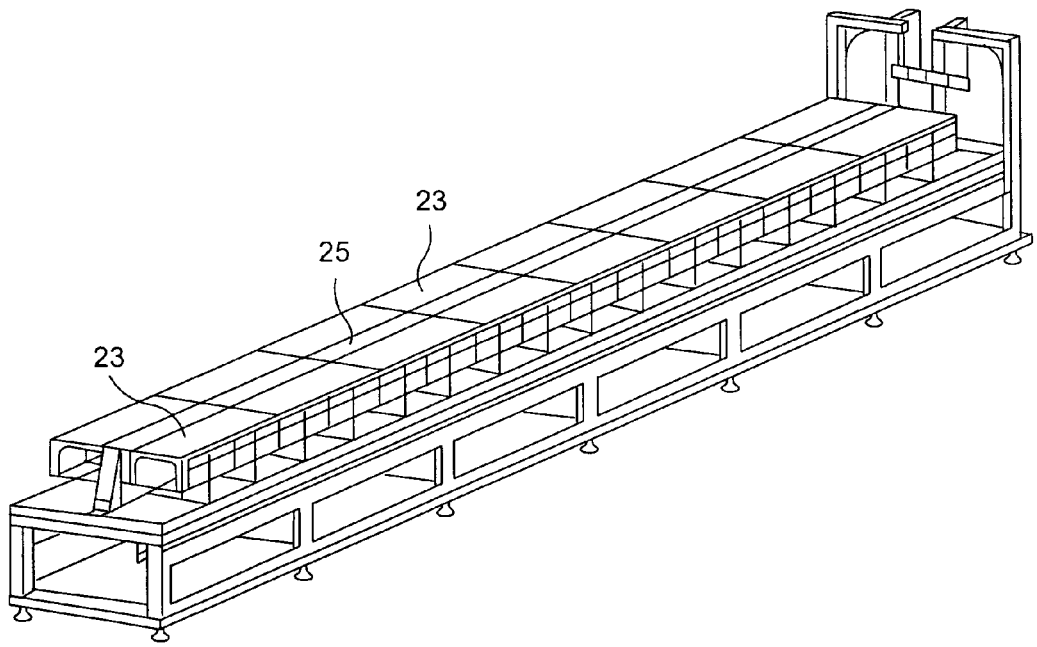
FIG. 2a shows a perspective view of the first tool used in the process object of the present invention.
Figure 2B:
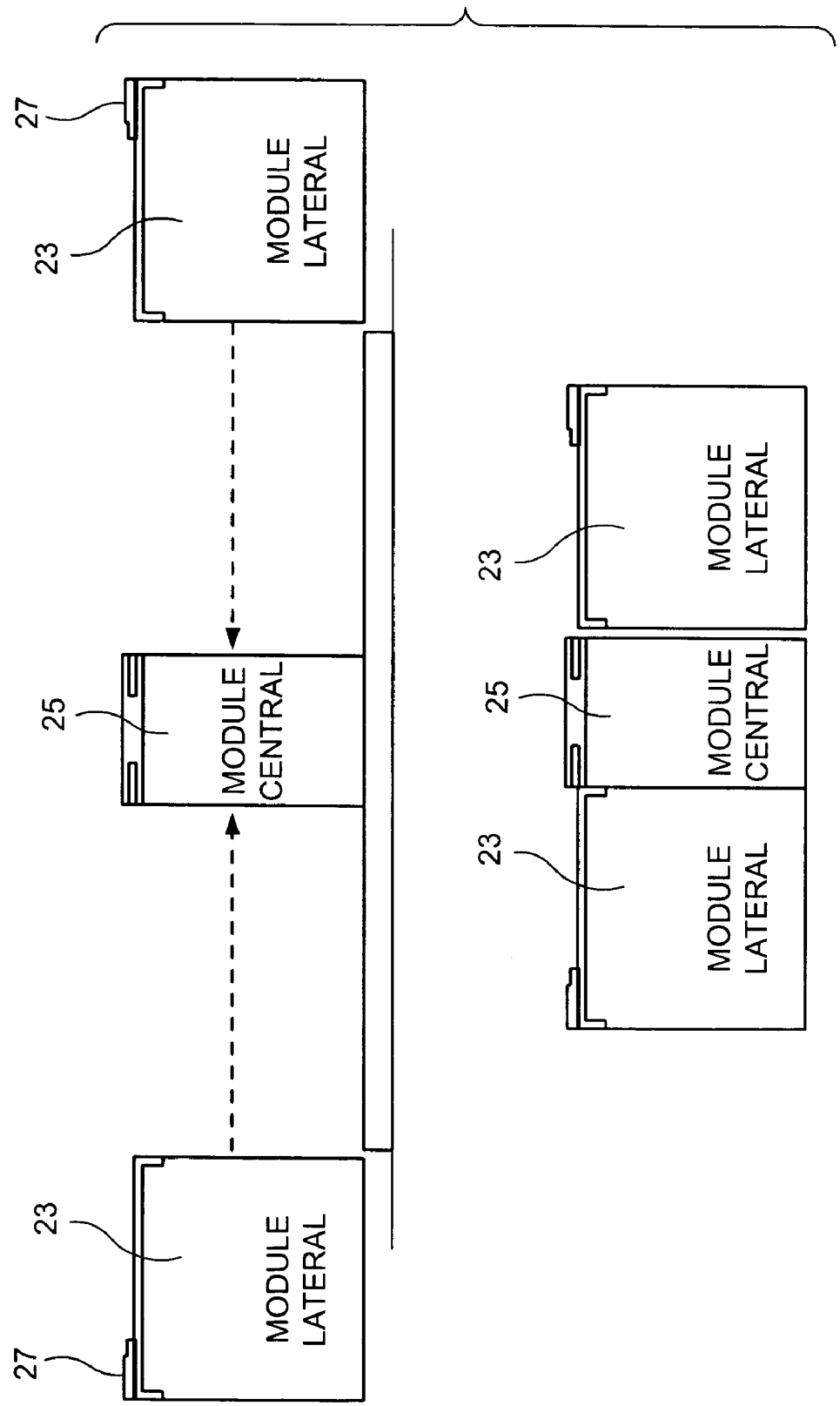
FIG. 2b schematically shows the components of the first tool used in the process object of the present invention.
Figure 3:
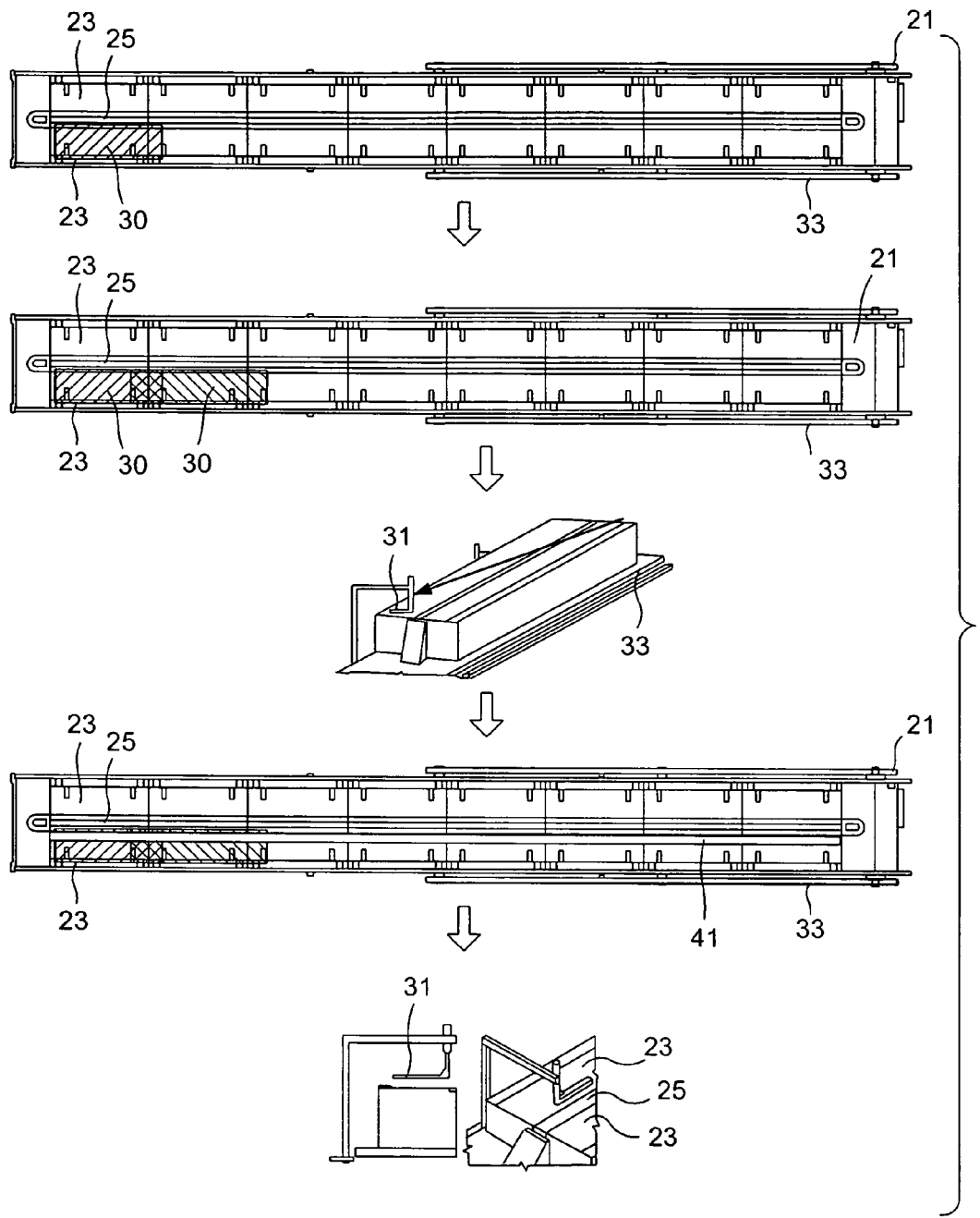
FIG. 3 schematically shows the different phases of the step for hot-forming planar laminates of the process object of the present invention.
Figure 4:
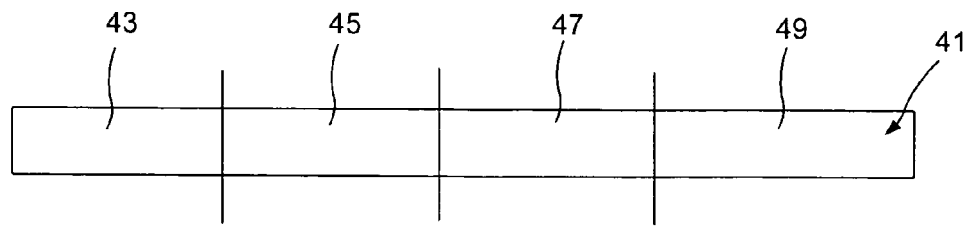
FIG. 4 schematically shows the cuts made in the planar laminate so as to obtain the laminates with the dimensions required for the preforms with C- and L-shaped sections.
Figure 6:
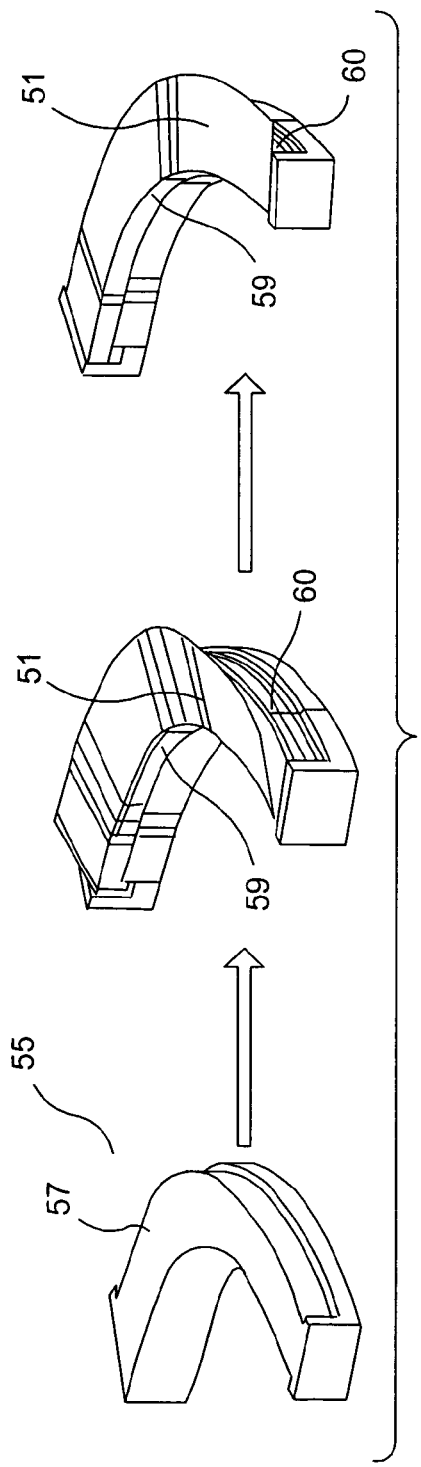
FIG. 6 schematically shows the different phases of the step for hot-forming the preforms with C- and L-shaped sections.
Figure 7B:
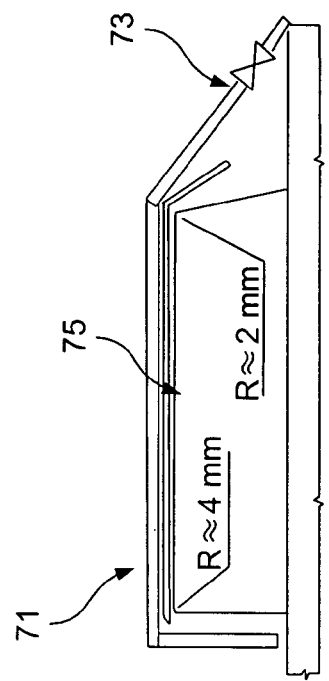
FIG. 7 shows schematic section views of the second tool used in the process object of the present invention.
Figure 7A:
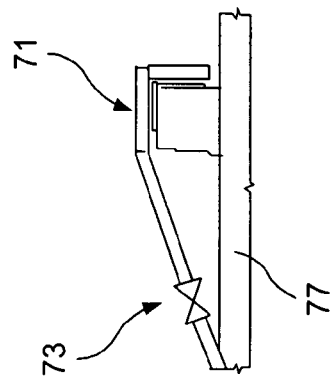
Figure 8:
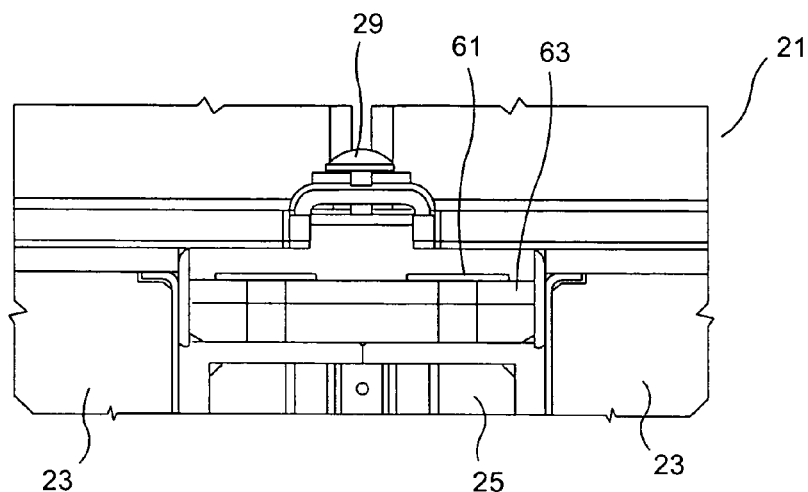
FIGS. 8 and 9 show schematic section views of the central module of the first tool.
Figure 9:
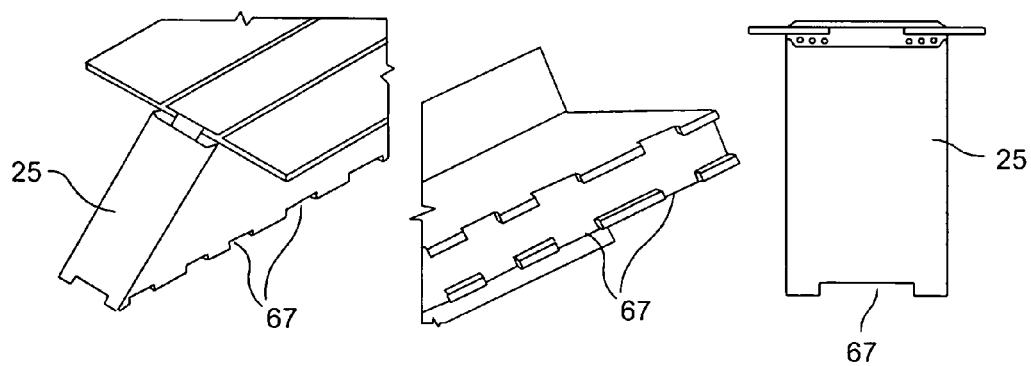

An embodiment of the process according to the invention for manufacturing aeronautical fuselage ring frame preforms with composites is described below.

The section to be manufactured is formed by a C shape 11 and by an L-shaped angle iron 13 made from fabric and reinforced with a unidirectional tape on the lower flange 15 to increase the moment of inertia and therefore the stiffness. Ring frames of up to 8 meters long with radiuses of curvature of up to 250 mm can be obtained with this invention.

Carrying out the process begins with providing the material needed to manufacture the laminates; the patterns obtained from the cutting process are manufactured in groups as per geometries, such that the cutting machine works only once, obtaining the pattern required from each one of them. An identification of each one of the parts is not required by means of this process, and it is only necessary to gradually take the required number of pieces of each geometry to manufacture the laminate.

For its part, the laminate tool 21 of the C- and L-shaped preforms (in each case with the suitable dimensions) is provided, coupling the side modules 23 to the central module 25. Longitudinal gibs 27 are fixed, positioned on the side modules 23 in the area where the laminating is carried out (any of the two side modules 23 is suitable for this).

To begin the laminate 41, the hold-down plate 29 of the top part of the tool 21 is removed. Then the rectangular patterns of the pieces of material 30 are arranged at +/−45° between the central module 25 and the gibs 27 of the side module 23 chosen for manufacture, longitudinally overlapping the patterns. The measurements of the contour dimensions as well as the displacement, cutting and overlap marks of the layers involved therein are shown by means of laser projectors. In order to integrate the reinforcements and overlap the pieces of material 30 until obtaining the entire length of the ring frame section, pressure and temperature are applied with a heating head 31 that can shift on guides on the sides of the table 33. The lowering of the heating head 31 above the laminate 41 is done by means of manually controlled pneumatic actuation. The heater can rotate +45°, +90°, −90°, −45° around the Z axis in order to be able to adhere the reinforcements of the unidirectional tape or overlaps, as the case may be. Once the laminate 41 is finished, it is to be cut in the areas marked, identifying each one of the resulting parts and the axes of symmetry with a white marker, thus it is clear that four ring frames 43, 45, 47, 49 are manufactured from the same laminate 41 at the same time.

The straight hot-forming of the C- and L-shaped preforms is carried out in the laminate tool 21 following the steps shown in FIG. 5. First a separating film 53 will be arranged so that the starting laminate 51 (with the dimension required for hot-forming the C- or L-shaped perform involved) does not adhere to the elastic membrane 54 and contaminate the material. Then the hold-down plate 29 is placed, which is quickly anchored through a pneumatic actuator to a projection on the central module 25, the cantilever of which overlaps on only a 10 mm longitudinal strip of laminate 41 and presses on it enough so that it is not dragged by the elastic membrane 54. Since the laminate 51 has longitudinal reinforcements with variable thickness in the area to be heated, the hold-down plate 29 must be discontinuous so as to couple to the different heights. Once the hold-down plate 29 is in place, the side modules 23 are carefully removed so as to not drag the previously generated laminate 41, and the ring frame with the elastic membrane 54 is placed. This elastic silicone membrane is vacuum-deformed, withstanding temperatures of 120° as the working temperature, and elongations of the order of 400%. Then with everything assembled, the hot-forming (temperature+vacuum) process is performed. The temperature is applied through the hot-forming tool 21. The central module 25 has resistors 61 embedded therein to heat the laminate 51. During hot-forming, these resistors heat the horizontal area where the laminate 51 and 5 mm (at most) of the vertical area is supported. To prevent the vertical area from being heated, an FV material 63 is placed in the tool in this area acting as a thermal insulator. The temperature to be reached locally is 100° C. (with a tolerance of +5° C.) for 20 minutes as a reference. The vacuum is carried out through the table 33 of the tool 21, made in aluminum honeycomb panel form, and the vacuum inlets are placed under the central module 25, which has longitudinal mortising with transverse bypasses 67.

To carry out the second hot-forming cycle the curved hot-forming tool 55 for the C- and L-shaped preforms is used. The laminates 51 of right angle section obtained in the previous step are placed on the hot-forming component 55 corresponding to the C- and L-shaped preforms, manually deforming them in order to couple them to the male part 57 without the occurrence of creases, first placing the flanges shaped in the previous step into the mortises 59 and then adapting the rest of the laminate to the tool which, in the case of the C-shaped preforms, means that in addition to the curved deformation, the deformation required for hot-forming the other flange must be carried out, using mortises 60 for that purpose.

Then a separating film is placed on the preforms, making the necessary cuts for the purpose of coupling it perfectly, and this is all held with elastic strips 71 with fastening clips 73, preventing the occurrence of creases in the radiuses and web. Control thermocouples will be positioned on each one of the preforms, in the middle of the flanges shaped in the first straight hot-forming cycle, introduced in it about 5 mm deep. Finally, the tool 55, formed by aluminum sheet metal 75 on a base sheet metal 77, also of aluminum, will be introduced in the hot-forming machine (temperature+vacuum cycles).

Once the preforms are shaped the excess parts will be cut away.

If it is necessary in the assembly to couple the outer flange of the ring frame to a planar support, such as the overlay, wedge-shaped accessories can be manufactured which are placed on the ring frames, coupling them to the flanges by means of the application of heat with an iron.

Now the preforms are ready for carrying out a ring frame of a fully integrated section by means of a process known as RTM injection.

Any modifications comprised within the scope defined by the following claims can be introduced in the preferred embodiment described above.

The invention claimed is:

1. A process for manufacturing composite ring frames for aeronautical fuselages by application of RTM technology to two preforms with C- and L-shaped sections, wherein said preforms are manufactured using a first tool and a second tool in the following steps:
   a) providing the fabric for the preforms in pieces of material cut according to preset patterns;
   b) hot-forming planar rectangular laminates by placing overlapping layers of pieces of material on a first tool in predetermined positions and number and applying pressure and temperature so that the overlapped pieces of material adhere to one another in local areas, and cutting the laminate into parts;

c) hot-forming laminates of right angle section from segments of said planar laminates of predetermined dimensions, obtained by cutting, on a part of a right angle section of the first tool, arranging on its top side a part intended for a flange of the preforms with a C- or L-shaped section, holding its longitudinal edge on the first tool and allowing the rest to be free, placing an elastic membrane on the first tool and applying a temperature and vacuum cycle;

d) hot-forming the preforms into a C shape and an L shape on a second curved tool by deforming said laminates of right angle section thereon, said deformation including in the case of C-shaped preforms the bending of a second flange, and applying a temperature and vacuum cycle.

2. A process for manufacturing composite ring frames for aeronautical fuselages according to claim 1, wherein the preset patterns for the pieces of material include rectangular patterns at +/−45° and unidirectional tape reinforcement for a flange.

* * * * *